(12) United States Patent
Carlson et al.

(10) Patent No.: US 8,920,154 B2
(45) Date of Patent: Dec. 30, 2014

(54) HEAD ASSEMBLY FOR USE IN A ROTARY HEAD EXTRUDER FOR EXTRUDING A FOOD PRODUCT

(75) Inventors: Jeff Dean Carlson, South Beloit, IL (US); Henry Zollinger Miller, Machesney Park, IL (US); Richard Jarvis Warner, Roscoe, IL (US)

(73) Assignee: American Extrusion International, South Beloit, IL (US)

( * ) Notice: Subject to any disclaimer, the term of this patent is extended or adjusted under 35 U.S.C. 154(b) by 0 days.

(21) Appl. No.: 13/470,849

(22) Filed: May 14, 2012

(65) Prior Publication Data
US 2012/0225154 A1    Sep. 6, 2012

Related U.S. Application Data

(63) Continuation of application No. 12/510,870, filed on Jul. 28, 2009, now Pat. No. 8,197,243.

(51) Int. Cl.
*B29C 47/22* (2006.01)
*A23P 1/12* (2006.01)
*B29C 47/32* (2006.01)
*B29C 47/00* (2006.01)

(52) U.S. Cl.
CPC . *A23P 1/12* (2013.01); *B29C 47/32* (2013.01); *B29C 47/003* (2013.01)
USPC ........ 425/466; 425/380; 425/381; 425/382.3; 425/382.4; 425/464; 426/516

(58) Field of Classification Search
CPC ........... A23P 1/12; B29C 47/20; B29C 47/22; B29C 47/24; B29C 47/26; B29C 47/30
USPC ................ 425/465, 466, 467, 145, 380, 381, 425/382.3, 382.4, 382 R, 382.2, 462, 463
See application file for complete search history.

(56) References Cited

U.S. PATENT DOCUMENTS

| | | | | |
|---|---|---|---|---|
| 4,021,170 A | * | 5/1977 | Andersen et al. | 425/72.1 |
| 4,083,667 A | * | 4/1978 | Livingston et al. | 425/192 R |
| 4,187,068 A | * | 2/1980 | Vassar | 425/381 |
| 4,402,898 A | * | 9/1983 | Rosenbaum | 264/171.27 |
| 5,217,302 A | * | 6/1993 | Jin-ping | 366/79 |
| 5,324,459 A | * | 6/1994 | Klein | 264/40.5 |
| 6,025,004 A | * | 2/2000 | Speck et al. | 426/516 |
| 6,257,863 B1 | * | 7/2001 | Otte | 425/381 |
| 6,261,081 B1 | * | 7/2001 | Speck et al. | 425/382.4 |
| 7,264,461 B2 | * | 9/2007 | Ouellette | 425/381 |
| 2005/0106280 A1 | * | 5/2005 | Karr et al. | 425/325 |

* cited by examiner

*Primary Examiner* — Seyed Masoud Malekzadeh
(74) *Attorney, Agent, or Firm* — Wood, Phillips, Katz, Clark & Mortimer

(57) ABSTRACT

A head assembly (10) is provided for use in a rotary head extruder (12) for extruding a food product. The head assembly (10) includes an annular-shaped stator plate (20) and a rotating blade plate (22). The blade plate (22) preferably includes at least six blades, each with a wedge shaped profile, and the stator plate (20) includes extrusion channels that extend at an angle in the range of 20°-50° from tangent to a circle defined by an inner surface (30) of the plate (20).

29 Claims, 4 Drawing Sheets

HEAD ASSEMBLY FOR USE IN A ROTARY HEAD EXTRUDER FOR EXTRUDING A FOOD PRODUCT

CROSS-REFERENCE TO RELATED APPLICATION

This application is a continuation of U.S. Ser. No. 12/510,870, filed Jul. 28, 2009, now issued as U.S. Pat. No. 8,197,243, the disclosure of which is hereby incorporated by reference.

FEDERALLY SPONSORED RESEARCH OR DEVELOPMENT

Not Applicable.

MICROFICHE/COPYRIGHT REFERENCE

Not Applicable.

FIELD OF THE INVENTION

This invention relates to extruders for extruding food product, and more particularly, to rotary head extruders wherein the food product is extruded radially outward between a pair of plates where one rotates relative to the other which is stationary.

BACKGROUND OF THE INVENTION

Rotary head extruders for extruding a food product are known and utilize head assemblies that include a stationary plate having extrusion channels and a rotating blade plate having a flat annular face surface that rotates past the extrusion channels and three blades that force raw food product radially outward into the extrusion channels where the food product is gelatinized under pressure and heat and extruded radially outward to form an extruded food product. Such machines have commonly been employed for making Cheetos® food snacks and have been in existence since the 1930's. Over the years there have been numerous attempts to improve the output capacity of such rotary head extruders but with no significant success. Accordingly, there is a continuing need to improve the output capacity of such machines.

SUMMARY OF THE INVENTION

In accordance with one feature of the invention, a head assembly is provided for use in a rotary head extruder for extruding a food product, the rotary head extruder including a feed screw mounted for rotation about an axis to direct raw food product to the head assembly for extrusion thereat. The head assembly includes an annular-shaped stator plate having a plurality of circumferentially spaced extrusion channels extending outwardly from a radially inner surface centered on the axis; and a rotating blade plate including a plurality of circumferentially spaced blades located to extend into an annular space underlying the extrusion channels and the radially inner surface of the stator plate.

In one feature, there are at least six of the circumferentially spaced blades. In a further feature, there are at least ten of the circumferentially spaced blades. In yet a further feature, there are at least twelve of the circumferentially spaced blades.

According to one feature, each of the blades has a circumferential width WC, and the circumferential spacing from one blade to the next is in the range of 0.7 to 1.5 times the width. WC.

As one feature, each of the blades has a wedge-shaped profile that diverges from a leading edge to a trailing edge.

In one feature, the head assembly further includes an impeller located on the end nose of the feed screw for rotations therewith and surrounded by the stator plate, the impeller including asset of impeller vanes; each of the vanes having a planer face transverse to the axis.

According to one feature, the head assembly further includes an impeller on the rotating blade plate surrounded by the blades, the impeller including a set of impeller vanes, each of the vanes having a planer face transverse to the axis.

As one feature, the head assembly further includes: a first impeller located on the end nose of the feed screw for rotations therewith and surrounded by the stator plate, the first impeller including a first set of impeller vanes, each of the vanes of the first set having a planer face transverse to the axis; and a second impeller on the rotating blade plate surrounded by the blades, the second impeller including a second set of impeller vanes, each of the vanes of the second set having a planer face that extends parallel to the faces of the first set of vanes.

In one feature, the annular-shaped stator plate includes a plurality of guide walls defining the extrusion channels, each of the guide walls extending at an angle in the range of 20°-50° from tangent to a circle defined by the inner surface. As a further feature, the angle is in the range of 30°-40°.

As one feature, the stator plate includes a plurality of guide wall defining at least fourteen of the extrusion channels.

In accordance with one feature of the invention, a head assembly is provided for use in a rotary head extruder for extruding a food product. The rotary head extruder includes a feed screw mounted for rotation about an axis to direct raw food product to the head assembly for extrusion thereat. The head assembly includes an end nose located on the feed screw for rotation therewith, and a rotating blade plate. The end nose has an outwardly facing cylindrical surface, and the blade plate has a plurality of circumferentially spaced blades located to extend over the cylindrical surface of the end nose, with each of the blades having a leading edge spaced from the cylindrical surface by a radial distance in the range of 0.0625-1.000 inches.

Other objects, features, and advantages of the invention will become apparent from a review of the entire specification, including the appended claims and drawings.

DETAILED DESCRIPTION OF THE PREFERRED EMBODIMENTS

Figure 1:
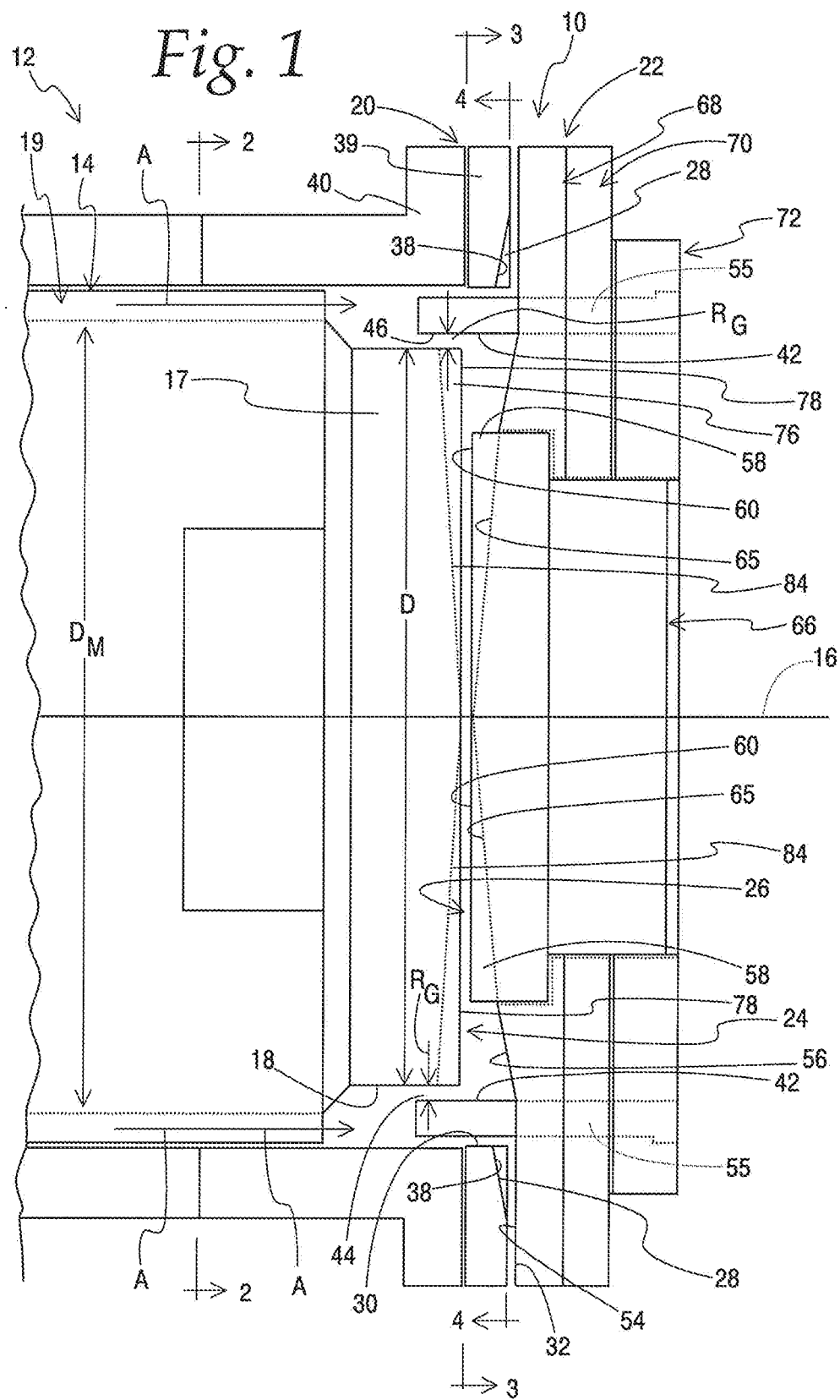
FIG. 1 is a somewhat diagrammatic section view of the head assembly for a rotary head extruder embodying the present invention.

A head assembly 10 is provided for use in a rotary head extruder 12 (only partially shown in the drawings) for extruding a food product. The rotary head extruder 12 includes a feed screw 14 mounted for rotation about an axis 16 to direct raw food product to the head assembly 10 for extrusion thereat, as shown by arrows "A". The feed screw 14 includes an end nose 17, preferably having an outwardly facing cylindrical surface 18 with a reduced outside diameter D relative to the minor diameter $D_m$ of the screw threads 19 of the feed screw 14. In one preferred embodiment, the feed screw has six thread leads, with the screw threads 19 having a major diameter $D_M$=8.92 inches, a minor diameter $D_m$=8.48 inches, and a reduced outside diameter D=7.75 inches.

The head assembly 10 includes an annular-shaped stator plate 20 and a rotating blade plate 22 that is preferably mounted for rotation about the axis 16 in a direction counter to the rotation of the feed screw 14. Preferably, a nose impeller 24 is located on the end nose 17 of the feed screw 14 for rotation therewith about the axis 16, and another nose impeller 26 is located on the rotating blade plate 22 for rotation therewith about the axis 16.

Figure 4:
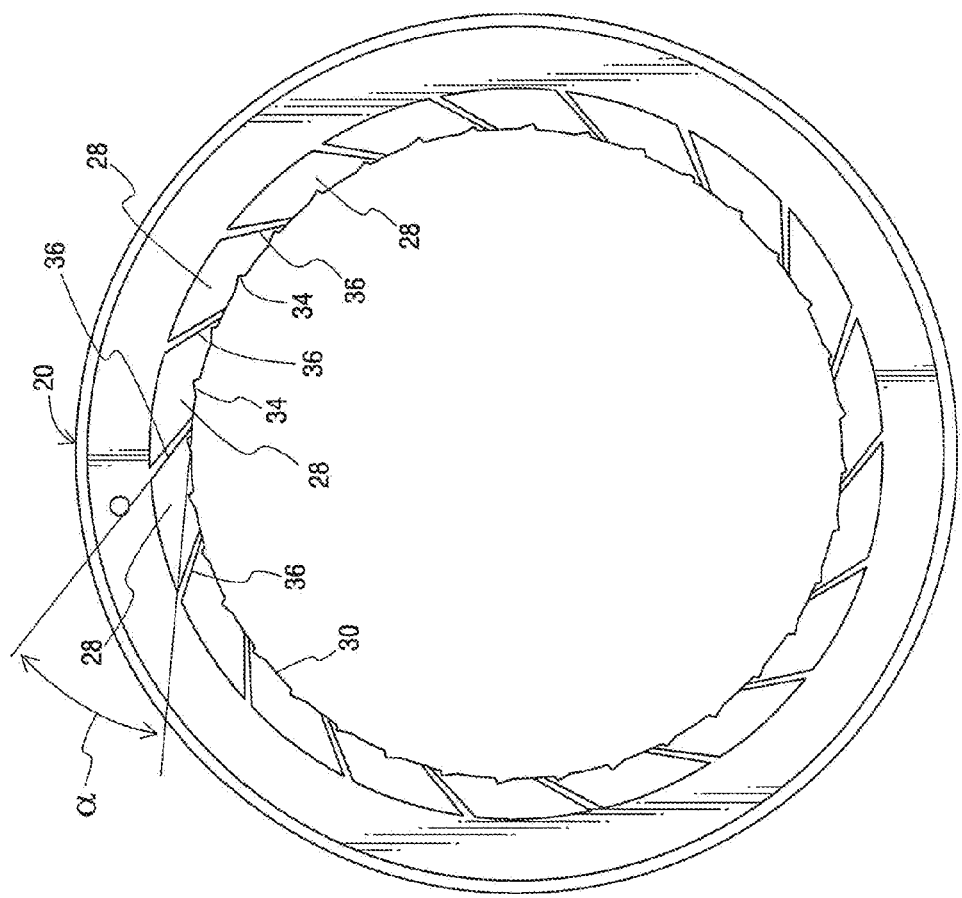
FIG. 4 is a view taken from line 4-4 in FIG. 1, but showing only the stationary plate.

As best seen in FIGS. 1 and 4, the stator plate 20 includes a plurality (18 in the illustrated embodiment) of circumferentially spaced, outwardly opening extrusion channels 28 extending from a radially inner surface 30 that is generally cylindrical and centered on the axis 16 to a radially outer surface 32 that is generally planar and transverse to the axis 16. As best seen in FIG. 4, the inner surface 30 may include a number of axially extending grooves 34 such as are employed on at least some conventional head assemblies. A plurality of guide walls (again 18 in the illustrated embodiment) 36 are provided between the extrusion channels 28 and, together with a conical surface 38 best seen in FIG. 1, define each of the extrusion channels 28. Preferably, each of the guide walls extends at an angle a in the range of 20°-50° from tangent to a circle centered on the axis 16 and defined by the inner surface 30. In a highly preferred embodiment, the angle a is in the range of 30°-40° from tangent and in a very preferred embodiment the angle a is 33°.

As best seen in FIG. 1, the stator plate 20 can be provided as a face plate 39 that is fixed to a backer plate 40 with the face plate 39 being made from a suitable material, such as brass, ceramic, or cast iron and the backer plate 40 being made from a suitable material, such as steel. In this regard, the heat conduction properties of the face plate material are important.

Figure 2:
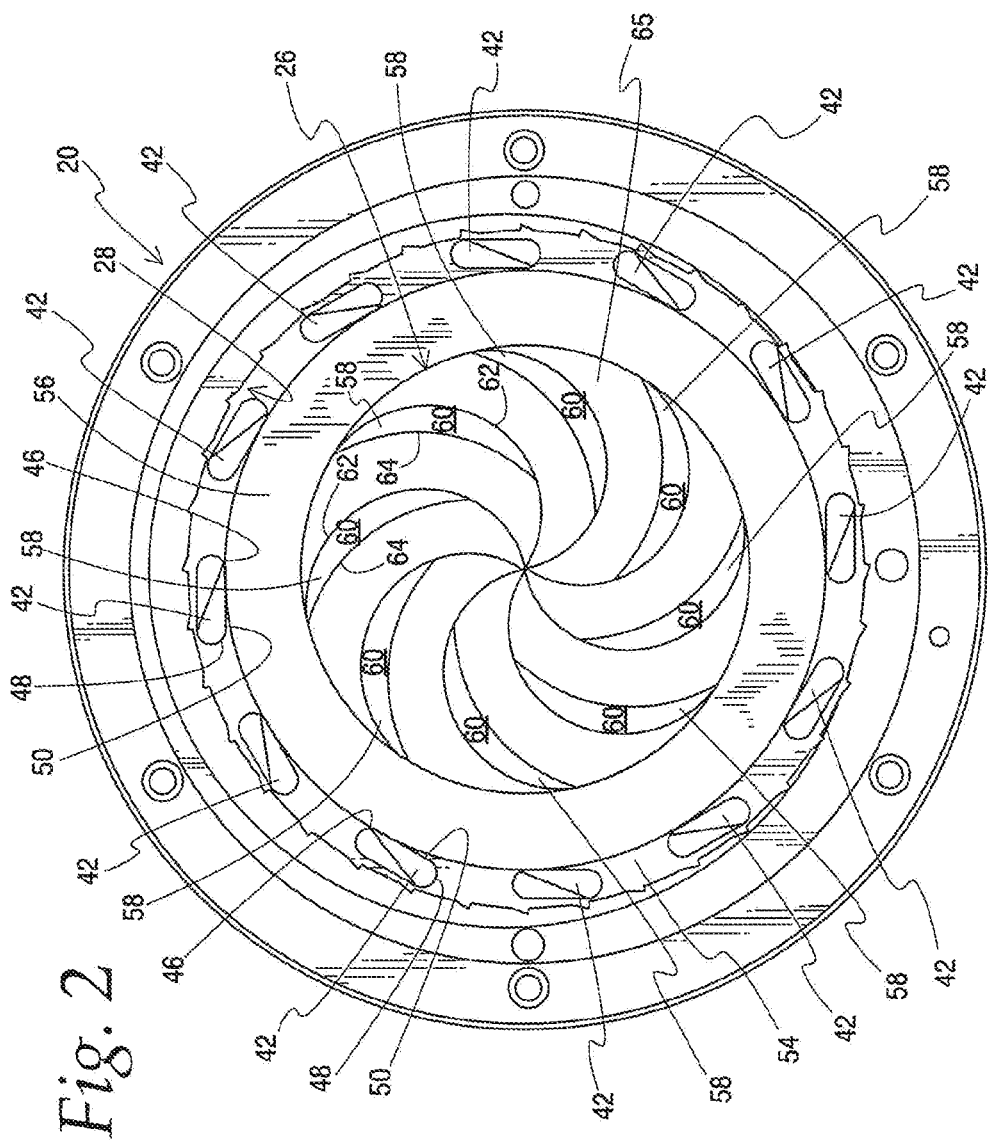
FIG. 2 is a view taken along line 2-2 in FIG. 1, but not showing a feed screw component of the assembly.
Figure 3:
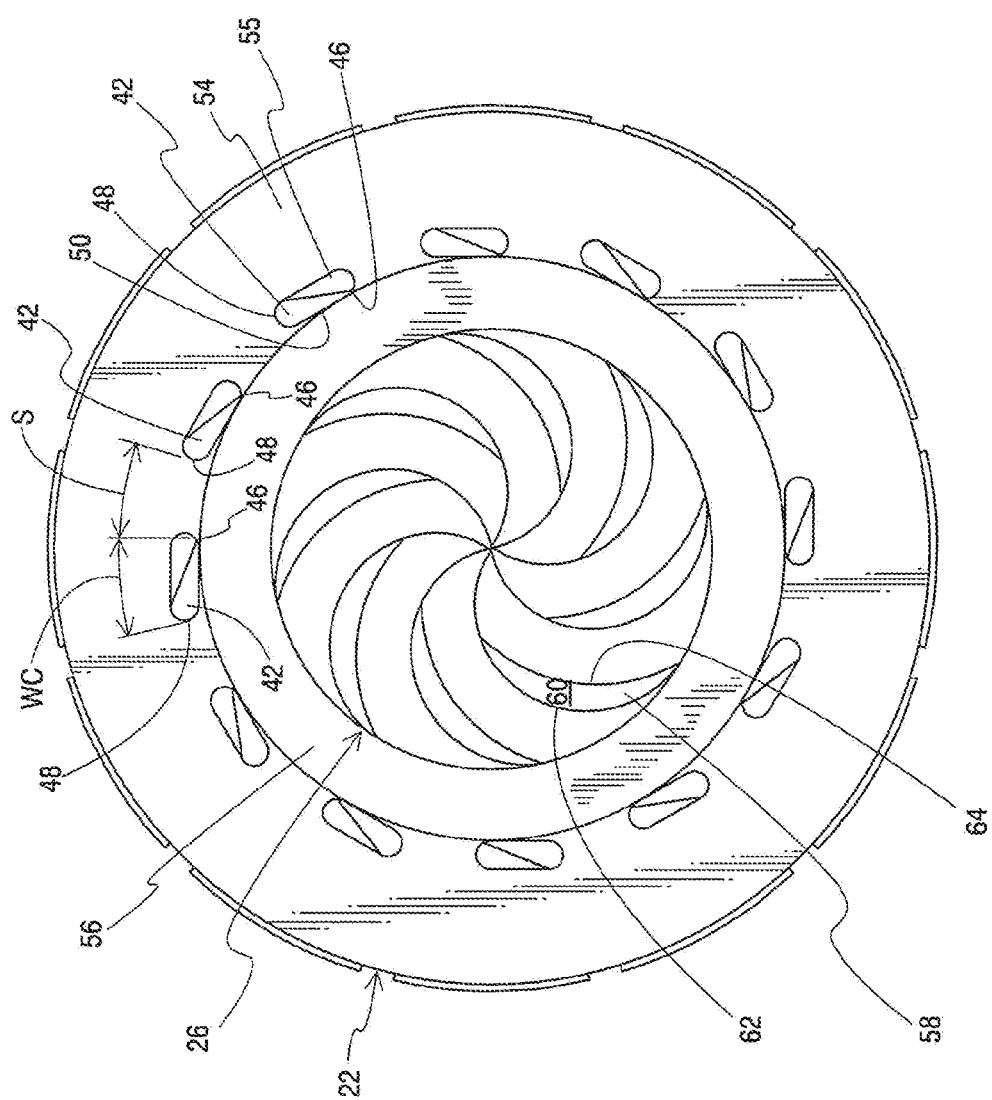
FIG. 3 is a view similar to FIG. 2, but showing only a rotating blade plate of the assembly.

As best seen in FIGS. 1 and 3, the rotating blade plate 22 includes a plurality (12 in the illustrated embodiment) of circumferentially spaced blades 42 located to axially extend into an annular space 44 underlying the inner surface 30 and extrusion channels 28 of the stator plate 24 and overlying the cylindrical surface 18 of the end nose 17. The blades 42 operate to force raw food product that has been delivered to the annular space 44 by the feed screw 14 radially outward into the extrusion channels 28. As best seen in FIGS. 2 and 3, each of the blades 42 preferably has a wedge-shaped profile that diverges from a leading edge 46 to a trailing edge 48. As best seen in FIG. 3, each of the blades 42 has a circumferential width WC from the leading edge 46 to the trailing edge 48, with a circumferential spacing S from the leading edge 46 of one blade 42 to the trailing edge 48 of next blade 42 preferably being in the range of 0.7 to 1.5 times the width WC, and in highly preferred embodiments, the circumferential spacing from one blade 42 to the next is in the range 0.85 to 1.125. In the illustrated embodiment, the circumferential spacing from one blade to the next is about 0.85 times the width WC.

Preferably, as best seen in FIG. 3, a radially inner, planar surface 50 of each of the blades 42 extends along a line tangent to an imaginary circle on which the leading edge 46 lies so that the leading edge 46 of each blade 42 is located radially inward from the remainder of the blade 42. In this regard, as best seen in FIG. 1, it is preferred that the radial distance $R_G$ between each of the edges 46 and the cylindrical surface 18 of the end nose 17 of the screw 14 be in the range of 0.0625 to 1.00 to allow the blades 42 to pick-up raw food product therefrom as the screw 14 and blades 42 rotate past each other. Further in this regard, it is more preferred that the leading edges 46 have a radial location that is just slightly larger than the outer cylindrical surface 18, with the radial distance $R_G$ being 0.13 inch or less. In one very preferred embodiment, the radial distance $R_G$ is 0.125 inch. Again as best seen in FIG. 1, each of the wedge-shaped profiles of the blades 42 extend axially away from a planar face surface 54 of the blade plate 22 that intersects with a conical surface 56 adjacent the leading edges 46 of the blades 42. As best seen in FIGS. 2 and 3, in the illustrated embodiment, each of the blades 42 includes a somewhat oval-shaped base 55 that extends into the blade plate 22 to mount the blade 42 to the blade plate 22, with only the wedge-shaped profile extending axially away from the surface 54. The surface 54 overlies the extrusion channels 28 and acts as a guide surface for the raw food product as it is forced radially outward through the extrusion channels 28. The surface 54 also overlies the planar surface 32, with the relative rotation of the planar surface 54 relative to the planar surface 32 creating a twist in the extruded food product exiting the extrusion channels 28.

As best seen in FIG. 2, the impeller 26 includes a set of impeller vanes 58 (8 in the illustrated embodiment), with each vane 58 having a somewhat crescent shape. As best seen in FIGS. 1 and 2, each of the vanes 58 has a planar face 60 that extends transverse to the axis 16, and leading and trailing side walls 62 and 64 that extend between conical surfaces 65 and the planar face 60 and define the crescent shape of the vane 58.

As best seen in FIG. 1, in the illustrated embodiment, the rotating plate 22 is a multi-piece assembly and includes a central nose cone component 66 defining the impeller 26, a face plate 68 defining the planar surface 54 and the conical surface 56, a backer plate 70 supporting the face plate 68 and the blades 42, a blade retaining plate 72, and the blades 42, which are preferably separate pieces made from a suitable material, such as durable steel, with the face plate 68 preferably being made from a suitable material, such as brass, ceramic, or cast iron. In this regard, the heat conduction properties of the face plate material are important.

As best seen in FIG. 1, the nose impeller 24 includes another set of impeller vanes 76, with each of the vanes 76 having a planar face 78 that extends parallel to the faces 60 of the vanes 58 and transverse to the axis 16. Preferably, the vanes 76 are crescent shaped similar to the vanes 58, and include leading and trailing side walls that extend from the planar face 78 to a conical surface 84 of the end nose 17.

In operation, the feed screw 14 directs raw food product into the annular space 44 where the rotating blades 42 force the raw food product at high pressure into the extrusion channels 28. The high pressure and temperature generated by the rotation of the blades 42 rotating plate 22 relative to the stationary stator plate 20 gelatinizes the raw food product as it forced radially outward to the axial gap between the planer surfaces 32 and 54. The now gelatinized food product is twisted by the relative rotation between the surfaces 32 and 54 and expands as it radially exits the head assembly 10. The impellers 24 and 26 act to restrict inward radial movement of the raw food product from the annular space 44 toward the axis 16, thereby minimizing stagnation and/or burning of the raw food product centrally between the nose 17 and the rotating plate 22.

The radial locations of the extrusion channels 44, the inner surface 30, the planar surface 32, the blades 42, and the planar surface 54 are generally in the range of 2 to 4 times greater than the radial locations of corresponding features in conventional head assemblies for rotary head extruders. The same is true for the features of the feed screw 14. This size increase offers the potential for greater output capacity, which can be realized through the use of the above described features of the head assembly 10. In this regard, a test head assembly based on the illustrated embodiment of the head assembly 10 demonstrated a pounds per hour output capacity that was over five times greater than current conventional rotary head extruders for extruding food product.

It should be appreciated that while a preferred embodiment has been shown and described herein, not every feature may be required for a given application and/or it may be desirable to modify some features. For example, while twelve of the blades 42 are shown, in some applications fewer or more blades may be desired. The same may be true for the extrusion channels 28 and the vanes 58 and 76. As another example, in some applications, it may be advantageous to employ one or more of the features disclosed herein in a head assembly that is conventional in size. As yet another example, in some applications, it may be desirable to employ blades 42 of a more conventional design in connection with the extrusion channels 28 as disclosed herein, or it may be desirable to employ the blades 42 as disclosed herein with more conventional extrusion channels. As another example, in some applications, it may be desirable to employ vanes 58 or 76 on a more conventional rotating blade plate or screw.

The invention claimed is:

1. A head assembly for use in a rotary head extruder for extruding a food product, the rotary head extruder including a feed screw mounted for rotation about an axis to direct raw food product to the head assembly for extrusion thereat, the head assembly comprising:
   an annular-shaped stator plate including a plurality of circumferentially spaced extrusion channels extending outwardly from a radially inner surface centered on the axis; and
   a rotating blade plate including at least six circumferentially spaced blades rotatable with the rotating blade plate and located to axially extend into an annular space underlying the extrusion channels and the radially inner surface of the stator plate, wherein the blades are configured to force the raw food product that has been delivered to the annular space by the feed screw radially outward into the extrusion channels.

2. The head assembly of claim 1 wherein there are at least ten of the circumferentially spaced blades.

3. The head assembly of claim 1 wherein there are at least twelve of the circumferentially spaced blades.

4. The head assembly of claim 1 wherein each of the blades has a wedge-shaped profile that diverges from a leading edge to a trailing edge.

5. The head assembly of claim 1 further comprising an impeller located on an end nose of the feed screw for rotations therewith and surrounded by the stator plate, the impeller including a set of impeller vanes; each of the vanes having a planer face transverse to the axis.

6. The head assembly of claim 1 further comprising an impeller on the rotating blade plate surrounded by the blades, the impeller including a set of impeller vanes, each of the vanes having a planer face transverse to the axis.

7. A head assembly for use in a rotary head extruder for extruding a food product, the rotary head extruder including a feed screw mounted for rotation about an axis to direct raw food product to the head assembly for extrusion thereat, the head assembly comprising:
   an annular-shaped stator plate including a plurality of circumferentially spaced extrusion channels extending outwardly from a radially inner surface centered on the axis;
   a first impeller located on an end nose of the feed screw for rotation therewith and surrounded by the stator plate, the first impeller including a first set of impeller vanes, each of the vanes of the first set having a planer face transverse to the axis;
   a rotating blade plate including a plurality of circumferentially spaced blades rotatable with the rotating blade plate and located to axially extend into an annular space underlying the extrusion channels and the radially inner surface of the stator plate, wherein the blades are configured to force the raw food product that has been delivered to the annular space by the feed screw radially outward into the extrusion channels; and
   a second impeller located on the rotating blade plate surrounded by the blades, the second impeller including a second set of impeller vanes, each of the vanes of the second set having a planer face that extends parallel to the planer faces of the first set of vanes.

8. The head assembly of claim 7 wherein there are at least six of the circumferentially spaced blades.

9. The head assembly of claim 7 wherein there are at least ten of the circumferentially spaced blades.

10. The head assembly of claim 7 wherein there are at least twelve of the circumferentially spaced blades.

11. The head assembly of claim 7 wherein each of the blades having a wedge-shaped profile that diverges from a leading edge to a trailing edge.

12. A head assembly for use in a rotary head extruder for extruding a food product, the rotary head extruder including a feed screw mounted for rotation about an axis to direct raw food product to the head assembly for extrusion thereat, the head assembly comprising:
   an annular-shaped stator plate including a plurality of guide walls defining a plurality of extrusion channels extending outwardly from a radially inner surface centered on the axis, each of the guide walls extending at an angle in a range of 20°-50° from tangent to a circle defined by the inner surface; and
   a rotating blade plate including a plurality of circumferentially spaced blades rotatable with the rotating blade plate and located to axially extend into an annular space underlying the extrusion channels and the radially inner surface of the stator plate, wherein the blades are configured to force the raw food product that has been delivered to the annular space by the feed screw radially outward into the extrusion channels.

13. The head assembly of claim 12 wherein the angle is in a range of 30°-40°.

14. The head assembly of claim 12 wherein there are at least six of the circumferentially spaced blades.

15. The head assembly of claim 12 wherein there are at least ten of the circumferentially spaced blades.

16. The head assembly of claim 12 wherein there are at least twelve of the circumferentially spaced blades.

17. The head assembly of claim 12 wherein each of the blades having a wedge-shaped profile that diverges from a leading edge to a trailing edge.

18. The head assembly of claim 12 further comprising an impeller located on an end nose of the feed screw for rotations therewith and surrounded by the stator plate, the impeller including a set of impeller vanes; each of the vanes having a planer face transverse to the axis.

19. The head assembly of claim 12 further comprising an impeller on the rotating blade plate surrounded by the blades, the impeller including a set of impeller vanes, each of the vanes having a planer face transverse to the axis.

20. A head assembly for use in a rotary head extruder for extruding a food product, the rotary head extruder including a feed screw mounted for rotation about an axis to direct raw food product to the head assembly for extrusion thereat, the head assembly comprising:
   an annular-shaped stator plate including a plurality of circumferentially spaced extrusion channels extending outwardly from a radially inner surface center on the axis; and
   a rotating blade plate including a plurality of circumferentially spaced blades rotatable with the rotating blade plate and located to axially extend into an annular space underlying the extrusion channels and the radially inner surface of the stator plate, each of the blades having a wedge-shaped profile that diverges from a leading edge to a trailing edge, wherein the blades are configured to force the raw food product that has been delivered to the annular space by the feed screw radially outward into the extrusion channels.

21. The head assembly of claim 20 wherein there are at least eight of the circumferentially spaced blades.

22. The head assembly of claim 20 wherein there are twelve of the circumferentially spaced blades.

23. The head assembly of claim 20 further comprising an impeller located on an end nose of the feed screw for rotations therewith and surrounded by the stator plate, the impeller including a set of impeller vanes; each of the vanes having a planer face transverse to the axis.

24. The head assembly of claim 20 further comprising an impeller on the rotating blade plate surrounded by the blades, the impeller including a set of impeller vanes, each of the vanes having a planer face transverse to the axis.

25. A head assembly for use in a rotary head extruder for extruding a food product, the rotary head extruder including a feed screw mounted for rotation about an axis to direct raw food product to the head assembly for extrusion thereat, the head assembly comprising:
   an annular-shaped stator plate including a plurality of guide walls defining at least fourteen extrusion channels extending outwardly from a radially inner surface centered on the axis; and
   a rotating blade plate including a plurality of circumferentially spaced blades rotatable with the rotating blade plate and located to axially extend into an annular space underlying the extrusion channels and the radially inner surface of the stator plate, wherein the blades are configured to force the raw food product that has been delivered to the annular space by the feed screw radially outward into the extrusion channels.

26. The head assembly of claim 25 wherein each of the guide walls extends at an angle in a range of 20° to 50° from tangent to a circle defined by the inner surface.

27. The head assembly of claim 25 wherein the guide walls define no more than twenty-one of the extrusion channels extending outwardly from the radially inner surface.

28. A head assembly for use in a rotary head extruder for extruding a food product, the rotary head extruder including a feed screw which mounts for rotation about an axis to direct raw food product to the head assembly for extrusion thereat, the head assembly comprising:
   an end nose located on the feed screw for rotation therewith, the end nose having an outwardly facing cylindrical surface;
   a rotating blade plate including a plurality of circumferentially spaced blades rotatable with the rotating blade plate and located to axially extend over the cylindrical surface of the end nose, each of the blades having a leading edge spaced from the cylindrical surface by a radial distance in a range of 0.0625 inch-1.000 inch, wherein the blades are configured to force the raw food product that has been delivered to the head assembly by the feed screw radially outward into extrusion channels.

29. The head assembly of claim 28 wherein the radial distance is in a range of 0.0625 inch-0.13 inch.

* * * * *